(12) United States Patent
Bell et al.

(10) Patent No.: US 12,470,552 B1
(45) Date of Patent: Nov. 11, 2025

(54) SECURE DATA PROCESSING USING DATA PACKAGES GENERATED BY EDGE DEVICES

(71) Applicant: Wells Fargo Bank, N.A., San Francisco, CA (US)

(72) Inventors: Thomas E. Bell, San Francisco, CA (US); Peter Bordow, Fountain Hills, AZ (US); Julio Jiron, San Bruno, CA (US); Akhlaq M. Khan, San Francisco, CA (US); Volkmar Scharf-Katz, San Francisco, CA (US); Jeff J. Stapleton, Arlington, TX (US); Richard Orlando Toohey, San Francisco, CA (US); Ramesh Yarlagadda, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 644 days.

(21) Appl. No.: 17/874,803

(22) Filed: Jul. 27, 2022

(51) Int. Cl.
*G06F 21/00* (2013.01)
*H04L 9/40* (2022.01)

(52) U.S. Cl.
CPC ........ *H04L 63/0861* (2013.01); *H04L 63/083* (2013.01)

(58) Field of Classification Search
CPC .......................... H04L 63/0861; H04L 63/083
See application file for complete search history.

(56) References Cited

U.S. PATENT DOCUMENTS

| | | |
|---|---|---|
| 7,133,846 B1 | 11/2006 | Ginter et al. |
| 7,673,797 B2 | 3/2010 | Edwards |
| 8,234,387 B2 | 7/2012 | Bradley et al. |
| 8,446,275 B2 | 5/2013 | Utter, II |
| 8,731,977 B1 | 5/2014 | Hardin et al. |

(Continued)

FOREIGN PATENT DOCUMENTS

| | | |
|---|---|---|
| CA | 2478548 C | 3/2014 |
| DE | 10 2021 108 925 A1 | 10/2022 |
| WO | WO-2011/016710 A1 | 2/2011 |
| WO | WO-2016/083987 A1 | 6/2016 |
| WO | WO-2019/013818 A1 | 1/2019 |
| WO | WO-2019/123291 A1 | 6/2019 |

OTHER PUBLICATIONS

Jain, et al., A Blockchain-Based distributed network for Secure Credit Scoring, 2019 5th International Conference on Signal Processing, Computing and Control (ISPCC), 306-12, Oct. 2019; ISBN-13: 978-1-7281-3988-3.

(Continued)

*Primary Examiner* — Kendall Dolly
(74) *Attorney, Agent, or Firm* — Foley & Lardner LLP (57) ABSTRACT

Disclosed are example methods, systems, and devices that allow for secure data processing using data packages generated by edge devices. The techniques include generating a biometric signature using information captured by a computing device, and encrypting user data obtained via the computing device using the biometric signature and a device identifier of the computing device. A security token can be generated and utilized by the computing device to generate a data package, which is configured such that any change to the data package would cause a validation process of the data package using the security token to fail. The data package can be encrypted using various digital keys and provided to secondary computing systems.

20 Claims, 4 Drawing Sheets

(56) References Cited

U.S. PATENT DOCUMENTS

| | | |
|---|---|---|
| 8,756,153 B1 | 6/2014 | Rolf |
| 8,831,972 B2 | 9/2014 | Angell et al. |
| 8,965,803 B2 | 2/2015 | Jung et al. |
| 9,087,058 B2 | 7/2015 | Neven et al. |
| 9,094,388 B2 | 7/2015 | Tkachev |
| 9,177,257 B2 | 11/2015 | Kozloski et al. |
| 9,443,298 B2 | 9/2016 | Ross et al. |
| 9,519,783 B2 | 12/2016 | Pruthi et al. |
| 9,558,397 B2 | 1/2017 | Liu et al. |
| 9,734,290 B2 | 8/2017 | Srinivas et al. |
| 9,864,992 B1 | 1/2018 | Robinson et al. |
| 10,024,684 B2 | 7/2018 | Wang |
| 10,044,700 B2 | 8/2018 | Gresham et al. |
| 10,075,445 B2 | 9/2018 | Chen et al. |
| 10,102,491 B2 | 10/2018 | Connolly et al. |
| 10,110,608 B2 | 10/2018 | Dureau |
| 10,127,378 B2 | 11/2018 | Toth |
| 10,142,362 B2 | 11/2018 | Weith et al. |
| 10,181,032 B1 | 1/2019 | Sadaghiani et al. |
| 10,210,527 B2 | 2/2019 | Radocchia |
| 10,218,510 B2 * | 2/2019 | Kinney ............... H04L 63/0876 |
| 10,313,336 B2 | 6/2019 | Giobbi |
| 10,362,027 B2 | 7/2019 | Eramian et al. |
| 10,387,695 B2 | 8/2019 | Engels et al. |
| 10,454,913 B2 * | 10/2019 | Maninder ............... G06F 21/44 |
| 10,505,965 B2 | 12/2019 | Moyle et al. |
| 10,552,596 B2 | 2/2020 | Wang et al. |
| 10,572,778 B1 | 2/2020 | Robinson et al. |
| 10,614,302 B2 | 4/2020 | Withrow |
| 10,664,581 B2 | 5/2020 | Hou et al. |
| 10,740,767 B2 | 8/2020 | Withrow |
| 10,757,097 B2 | 8/2020 | Yocam et al. |
| 10,778,676 B1 | 9/2020 | Griffin et al. |
| 10,834,084 B2 | 11/2020 | Ouellette et al. |
| 10,855,679 B2 | 12/2020 | Rajakumar |
| 10,938,828 B1 | 3/2021 | Badawy et al. |
| 10,943,003 B2 | 3/2021 | Bingham et al. |
| 10,963,670 B2 | 3/2021 | Ross et al. |
| 10,977,353 B2 | 4/2021 | Bender et al. |
| 11,044,267 B2 | 6/2021 | Jakobsson et al. |
| 11,048,794 B1 | 6/2021 | Bordow |
| 11,048,894 B2 | 6/2021 | Feldman |
| 11,055,390 B1 | 7/2021 | Kragh |
| 11,057,366 B2 | 7/2021 | Avetisov et al. |
| 11,068,909 B1 | 7/2021 | Land et al. |
| 11,075,904 B2 | 7/2021 | Jha et al. |
| 11,089,014 B2 | 8/2021 | Buscemi |
| 11,093,789 B2 | 8/2021 | Wang et al. |
| 11,100,503 B2 * | 8/2021 | Iyer ..................... G06Q 20/401 |
| 11,127,092 B2 | 9/2021 | Kurian |
| 11,128,467 B2 | 9/2021 | Chapman et al. |
| 11,151,550 B2 | 10/2021 | Prabhu et al. |
| 11,157,907 B1 | 10/2021 | Kumar |
| 11,163,931 B2 | 11/2021 | Ricci |
| 11,200,306 B1 | 12/2021 | Singh |
| 11,205,011 B2 | 12/2021 | Jakobsson et al. |
| 11,223,646 B2 | 1/2022 | Cunningham et al. |
| 11,290,448 B1 | 3/2022 | Bordow |
| 11,327,992 B2 | 5/2022 | Batsakis et al. |
| 11,405,189 B1 * | 8/2022 | Bennison ............ H04L 63/0807 |
| 11,451,532 B2 | 9/2022 | Arif Khan et al. |
| 11,461,298 B1 | 10/2022 | Shemmer et al. |
| 11,509,477 B1 * | 11/2022 | Poder ................... G06V 40/165 |
| 11,514,155 B1 | 11/2022 | Bordow |
| 11,522,867 B2 | 12/2022 | Han et al. |
| 11,669,611 B1 | 6/2023 | Bordow |
| 12,034,719 B2 | 7/2024 | Budman et al. |
| 2003/0086341 A1 | 5/2003 | Wells et al. |
| 2006/0129478 A1 | 6/2006 | Rees |
| 2007/0078908 A1 | 4/2007 | Rohatgi et al. |
| 2008/0022370 A1 | 1/2008 | Beedubail et al. |
| 2008/0120302 A1 | 5/2008 | Thompson |
| 2009/0089107 A1 | 4/2009 | Angell et al. |
| 2009/0089205 A1 | 4/2009 | Bayne |
| 2012/0237908 A1 | 9/2012 | Fitzgerald et al. |
| 2014/0200885 A1 | 7/2014 | Diggins |
| 2015/0112732 A1 | 4/2015 | Trakru et al. |
| 2015/0220999 A1 | 8/2015 | Thornton et al. |
| 2015/0317728 A1 | 11/2015 | Nguyen |
| 2016/0050557 A1 | 2/2016 | Park et al. |
| 2016/0162882 A1 | 6/2016 | Mcclung, III |
| 2016/0224773 A1 | 8/2016 | Ramaci |
| 2016/0335629 A1 | 11/2016 | Scott |
| 2017/0012992 A1 | 1/2017 | Doctor et al. |
| 2017/0063831 A1 | 3/2017 | Arnold et al. |
| 2017/0063946 A1 | 3/2017 | Quan et al. |
| 2017/0111351 A1 | 4/2017 | Grajek et al. |
| 2017/0230351 A1 | 8/2017 | Hallenborg |
| 2017/0236037 A1 | 8/2017 | Rhoads et al. |
| 2018/0068103 A1 | 3/2018 | Pitkänen et al. |
| 2018/0205546 A1 | 7/2018 | Haque et al. |
| 2019/0095916 A1 | 3/2019 | Jackson |
| 2019/0098500 A1 * | 3/2019 | Chen ................... H04W 12/069 |
| 2019/0149539 A1 | 5/2019 | Scruby |
| 2019/0163889 A1 | 5/2019 | Bouse |
| 2019/0205939 A1 | 7/2019 | Lal et al. |
| 2019/0296913 A1 * | 9/2019 | Verma ................. H04L 63/0838 |
| 2019/0334724 A1 | 10/2019 | Anton et al. |
| 2019/0342276 A1 | 11/2019 | Sherif et al. |
| 2020/0036709 A1 * | 1/2020 | Mars ................... H04L 63/0853 |
| 2020/0211031 A1 | 7/2020 | Patil |
| 2020/0236113 A1 * | 7/2020 | Monica ..................... H04L 9/50 |
| 2020/0266985 A1 | 8/2020 | Covaci et al. |
| 2020/0311678 A1 | 10/2020 | Fletcher et al. |
| 2020/0320619 A1 | 10/2020 | Motaharian et al. |
| 2020/0374311 A1 | 11/2020 | Madhu et al. |
| 2020/0380598 A1 | 12/2020 | Spector et al. |
| 2021/0027061 A1 | 1/2021 | Xu et al. |
| 2021/0029100 A1 * | 1/2021 | Bendersky .......... H04L 63/0876 |
| 2021/0089637 A1 | 3/2021 | Cummins et al. |
| 2021/0104008 A1 | 4/2021 | Ross et al. |
| 2021/0110004 A1 | 4/2021 | Ross et al. |
| 2021/0134434 A1 | 5/2021 | Riley et al. |
| 2021/0202067 A1 | 7/2021 | Williams et al. |
| 2021/0231706 A1 | 7/2021 | Pak |
| 2021/0234673 A1 * | 7/2021 | Kurian ................... H04L 9/3234 |
| 2021/0234693 A1 * | 7/2021 | Kurian ..................... H04L 9/088 |
| 2021/0240837 A1 | 8/2021 | Tseng et al. |
| 2021/0258155 A1 | 8/2021 | Andon et al. |
| 2021/0279475 A1 | 9/2021 | Tusch et al. |
| 2021/0297259 A1 * | 9/2021 | Rahn ..................... H04L 9/0897 |
| 2021/0325427 A1 | 10/2021 | Jain et al. |
| 2021/0326467 A1 | 10/2021 | Levy et al. |
| 2021/0366014 A1 | 11/2021 | Wang et al. |
| 2021/0366586 A1 | 11/2021 | Ryan et al. |
| 2021/0399895 A1 * | 12/2021 | Abadir ................. G06F 21/602 |
| 2022/0004616 A1 * | 1/2022 | Eisen ................... G06K 7/1443 |
| 2022/0086141 A1 * | 3/2022 | Mossler ................. G06F 21/35 |
| 2022/0292396 A1 | 9/2022 | Biryukov et al. |
| 2022/0345451 A1 * | 10/2022 | Hitchcock ............... H04L 63/08 |
| 2023/0097761 A1 * | 3/2023 | de la Bastide ........ H04W 12/47 |
| | | 726/4 |
| 2023/0334476 A1 * | 10/2023 | Rule ..................... H04L 9/3247 |
| 2023/0403144 A1 * | 12/2023 | Rhodin ................. H04L 9/3239 |
| 2024/0039537 A1 | 2/2024 | Kumar et al. |
| 2024/0064135 A1 | 2/2024 | Sherlock et al. |
| 2024/0185596 A1 | 6/2024 | Neuschä,, fer et al. |
| 2024/0185660 A1 * | 6/2024 | Masood ..................... G07C 9/27 |
| 2024/0214194 A1 | 6/2024 | Kapur et al. |
| 2024/0256878 A1 | 8/2024 | Palleti et al. |
| 2024/0340314 A1 | 10/2024 | Radon et al. |
| 2024/0346085 A1 | 10/2024 | Soon-Shiong |

OTHER PUBLICATIONS

Yan Zhang et al., Real-time Machine Learning Prediction of an Agent-Based Model for Urban Decision-making, URL: https://ifaamas.org/Proceedings/aamas2018/pdfs/p2171.pdf (Jul. 10-15, 2018).

* cited by examiner

FIG. 1

Digital Identity Element Categories

| #Geolocation | Online Posts / Pics | Legal History |
| Personal Data | Hobbies | Financial |
| Health History | Education | Art / Music |
| Romance / Marriage | Faith / Religion | State / Government |
| Work History | Travel | News / Reports |
| Charity / Volunteer | Transactions | Friends / Family |

SECURE DATA PROCESSING USING DATA PACKAGES GENERATED BY EDGE DEVICES

TECHNICAL FIELD

The present disclosure relates to secure data processing using data packages generated by edge devices.

BACKGROUND

Client applications can access resources from servers. In many cases, applications utilize authenticating information that may be used to permit access information related to a user. However, gathering authenticating information is an inherently insecure and therefore challenging process.

SUMMARY

The present techniques can be utilized for secure data processing using data packages generated by edge devices. Obtaining authenticating information is an inherently insecure and therefore challenging process. To address these issues, the systems and methods described herein can scan biometric signatures of a user of a computing device and encrypt user data using, derived from, or otherwise based on the biometric signature and a device identifier of the computing device. A digital key can then be generated that grants access to the encrypted user data. A trusted computing device can verify the encrypted user data based on the digital key and can provide a security token corresponding to the encrypted data. The encrypted user data and the security token can be used to generate a data package, which if altered would invalidate the security token. A second digital key corresponding to the data package can then be generated and transmitted with the data package to other computing systems for processing. These techniques can be performed by an edge-computing device, thereby solving the aforementioned security issues relating to insecure gathering.

One aspect of the present disclosure relates to a method for generating authentication data packages based on physical features. The method may be performed, for example, by one or more processors of a computing device. The method can include scanning, using a sensor of the computing device, a physical feature of a user of the computing device. The method can include generating, based on the scan of the physical feature, by the computing device a biometric signature corresponding to the physical feature. The method can include generating user data based on inputs detected via one or more input devices of the computing device. The inputs can include information on the user. The method can include retrieving a device identifier corresponding to the computing device. The method can include encrypting, based on the biometric signature and the device identifier, the user data to generate encrypted user data. The method can include generating a first digital key granting access to the encrypted user data and transmitting the first digital key to a first computing system. The method can include receiving, from the first computing system, a security token corresponding to the user data. The security token can indicate that at least a subset of the user data is valid. The method can include storing, at the computing device, the encrypted user data and the security token as part of a data package that is secured and validated in a storage device of the computing device. An attempt to alter the data package can invalidate the security token. The method can include generating a second digital key corresponding to the data package. The method can include transmitting the data package and the second digital key to a second computing system for use to provide the user a service (e.g., access to a virtual or physical space).

In some implementations of the method, the data package can be transmitted in response to detecting a user input indicating that the information on the user is to be provided to the second computing system. In some implementations of the method, the data package can be transmitted to the second computing system in response to a request from the second computing system. In some implementations of the method, encrypting the user data based on the biometric signature and the device identifier can include using data based on (e.g., derived from) both the biometric signature and the device identifier to encrypt the user data.

In some implementations, the physical feature can be a facial feature. In some implementations, the biometric signature can be based on facial biometric data detected using the sensor. In some implementations, the physical feature can be a voice of the user. In some implementations, the sensor can be a microphone of the computing device. In some implementations, the user inputs can include an image captured using an image sensor of the computing device. In some implementations, the method can include further including analyzing the image to determine image integrity. In some implementations, analyzing the image can include using at least one of a non-visible light filter or a neural network.

In some implementations, the user data can include information extracted from an image captured using an image sensor of the computing device. In some implementations, scanning the physical feature of the user can include using a plurality of filters to determine authenticity of the physical feature. In some implementations, the plurality of filters corresponds to a plurality of non-visible light frequencies. In some implementations, determining authenticity of the physical feature can include determining a likelihood that an appearance of the user is forged. In some implementations, generating the user data can include performing a hashing operation on the information on the user.

In some implementations, the method can include further including detecting, using a location sensor of the computing device, a geolocation of the computing device corresponding to where the inputs are detected by the computing device. In some implementations, the user data can be generated to include the geolocation. In some implementations, retrieving the device identifier can include requesting the device identifier from an operating system of the computing device. In some implementations, the first and second digital keys can be first and second public keys.

Another aspect of the present disclosure relates to a system configured for generating authentication data packages based on physical features. The system can include a computing device comprising one or more processors configured by machine-readable instructions. The system can scan, using a sensor of a computing device, a physical feature of a user of the computing device. The system can comprise having the computing device generate, based on the scan of the physical feature, a biometric signature corresponding to the physical feature. The system can generate user data based on inputs detected via one or more input devices of the computing device. The inputs can include information on the user. The system can retrieve a device identifier corresponding to the computing device. The system can encrypt, based on the biometric signature and the device identifier, the user data to generate encrypted user data. The system can generate a first digital key granting access to the encrypted user data and transmit the first digital key to a first computing system. The system can receive, from the first computing system, a security token corresponding to the user data. The security token can indicate that at least a subset of the user data is valid. The system can store, at the computing device, the encrypted user data and the security token as part of a data package that is secured and validated in a storage device of the computing device. An attempt to alter the data package can invalidate the security token. The system can generate a second digital key corresponding to the data package. The system can transmit the data package and the second digital key to a second computing system for use to provide the user a service.

In some implementations, the data package can be transmitted in response to detecting a user input indicating that the information on the user is to be provided to the second computing system. In some implementations, encrypting the user data based on the biometric signature and the device identifier can include using data based on (e.g., derived from) both the biometric signature and the device identifier to encrypt the user data.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for secure data processing using data packages generated by edge devices. The various concepts introduced above and discussed in detail below may be implemented in any of numerous ways, as the described concepts are not limited to any particular manner of implementation. Examples of specific implementations and applications are provided primarily for illustrative purposes.

Various embodiments described herein relate to systems and methods for secure data processing using data packages generated by edge devices. Obtaining authenticating information is an inherently insecure and therefore challenging process. To address these issues, the systems and methods described herein can scan biometric signatures of a user of a computing device and encrypt user data using, derived from, or otherwise based on the biometric signature and a device identifier of the computing device. A digital key can then be generated that grants access to the encrypted user data. A trusted computing device can verify the encrypted user data based on the digital key and can provide a security token corresponding to the encrypted data. The encrypted user data and the security token can be used to generate a data package, which if altered would invalidate the security token. A second digital key corresponding to the data package can then be generated and transmitted with the data package to other computing systems for processing. These techniques can be performed by an edge-computing device, thereby solving the aforementioned security issues relating to insecure gathering.

Embodiments of the present techniques can serve as a basis for a wide range of authentication procedures utilizing the data packages, including government services, healthcare and effectively any service that implements authentication of users. A single, unique digital identity construct offers a number of advantages, and utilizing the data packages described herein to securely capture the information for that data construct enables increased efficiency through edge computing. Traditional passwords may be replaced with identity-based authentication systems that utilize the data packages described herein. A common framework for establishing trusted identities for individuals, entities (e.g., organizations), and devices can be achieved (something useful for, e.g., the developing Internet of Things). Secure, context-specific identity validation or confirmation for common services such as hotel check-in, financial institutions, social services, car rental, online authentication, etc., can be achieved. Furthermore, the claimed technology increases the security and efficiency for the transmission or sharing of physical documents, which may otherwise be easily being falsified, altered, or tampered with.

Edge devices as used herein are computing devices that are closer to the peripheries of networks, and often closer to sources of data, than a central server that receives data from multiple computing devices may be. A typical edge device may be a mobile device. Additional information may be found at https://spatten.mit.edu/ ("SpAtten: Efficient Natural Language Processing").

Figure 1:
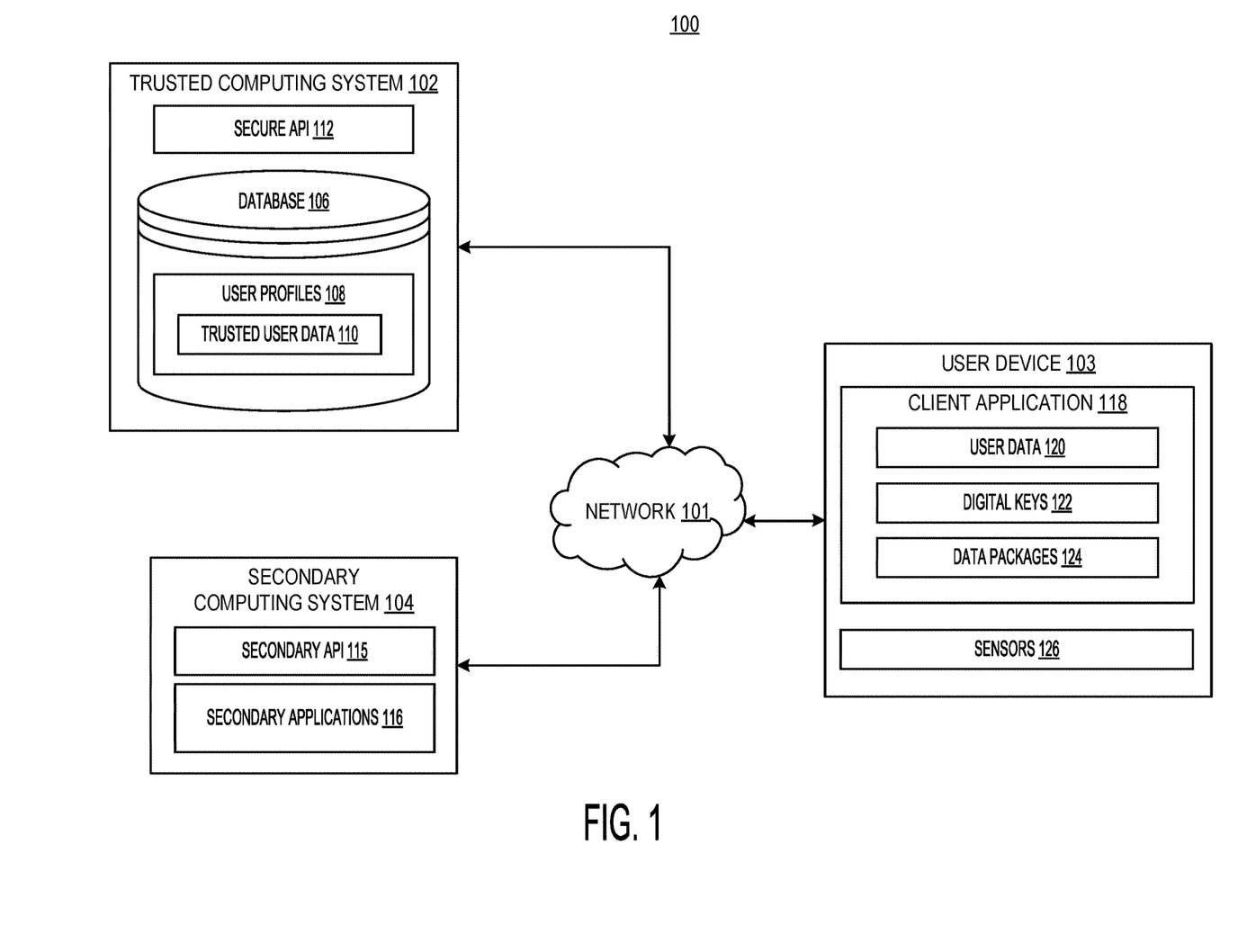
FIG. 1 is a block diagram of an example system for secure data processing using data packages generated by edge devices, in accordance with one or more example implementations.

Referring to FIG. 1, illustrated is a block diagram of an example system 100 for secure data processing using data packages generated by edge devices, in accordance with one or more example implementations. The system 100 may include a trusted computing system 102, a user device 103, and a secondary computing system 104. Each of the trusted computing system 102, the secondary computing system 104, and the user device 103 can be in communication with one another via the network 101. The network 101 can facilitate communications among the trusted computing system 102, the user device 103, and the secondary computing system 104 over, for example, the internet or another network via any of a variety of network protocols such as Ethernet, Bluetooth, Cellular, or Wi-Fi.

Each device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

The trusted computing system 102 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The trusted computing system 102 can include one or more computing devices or servers that can perform various functions as described herein. The trusted computing system 102 can include any or all of the components and perform any or all of the functions of the computer system 400 described herein in conjunction with FIG. 4.

The trusted computing system 102 may be a computing system of a trusted entity, such as a government entity or a trusted and independent third party, which maintains information that is known to correspond to one or more users (sometimes referred to as "verified" or "ground truth" information). For example, the trusted computing system 102 may be maintained or operated by non-financial institutions and may be associated with government agencies, social media platforms, or user databases, among others. The trusted computing system 102 may include one or more network interfaces that facilitate communication with other computing systems of the system 100 via the network 101. In some implementations, the system 100 may include multiple trusted computing systems 102, which may be controlled or operated by a single entity or multiple entities.

The user device 103 can include at least one processor and a memory (e.g., a processing circuit). The memory can store processor-executable instructions that, when executed by a processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The user device 103 can include one or more computing devices or servers that can perform various functions as described herein. The user device 103 can include any or all of the components and perform any or all of the functions of the computer system 400 described herein in conjunction with FIG. 4.

The user device 103 may include mobile or non-mobile devices, such as smartphones, tablet computing devices, wearable computing devices (e.g., a smartwatch, smart optical wear, etc.), personal computing devices (e.g., laptops or desktops), voice-activated digital assistance devices (e.g., smart speakers having chat bot capabilities), portable media devices, vehicle information systems, or the like. The user device 103 may access one or more software applications running locally or remotely. The user device 103 may operate as a "thin client" device, which presents user interfaces for applications that execute remotely (e.g., at the trusted computing system 102, the secondary computing system(s) 104, etc.). The user device 103 can be associated with a respective device identifier. The identifier may be a universally unique identifier (UUID), a globally unique identifier (GUID), a media access control (MAC) address, an internet protocol (IP) address, a device serial number, a serial number of a component of the user device 103, a predetermined or randomly generated value associated with the user device 103, or any type of identifier that identifies the user device 103 or the components thereof.

Input from the user received via the user device 103 may be communicated to the server executing the remote application, which may provide additional information to the user device 103 or execute further operations in response to the user input. In some examples, a user may access any of the computing devices of the system 100 through various user devices 103 at the same time or at different times. For example, the user may access one or more computing systems of the system 100 via a digital assistance device 103 while also accessing one or more computing systems of the system 100 using a wearable computing device 103 (e.g., a smart watch). In other examples, the user may access one or more computing systems of the system 100 via a digital assistance device 103 and later access the system 100 via a vehicle information system 103, via desktop computing system, or a laptop computing system.

The user device 103 can execute a client application 118, which may provide one or more user interfaces and receive user input via one or more input/output (I/O) devices. The client application 118 may be provided by or be associated with the trusted computing system 102 or the secondary computing system 104. In some implementations, the client application 118 may be a web-based application that is retrieved and displayed in a web-browser executing at the trusted computing system 102 or the secondary computing system 104. In some implementations, the client application 118 can execute locally at the user device 103 and may communicate information with the secondary computing systems 104 or the trusted computing system 102 via the network 101. The client application 118 can access one or more device identifiers using an application programming interface (API) of an operating system of the user device 103. In some implementations, the client application 118 can access a predetermined region of memory where the user device 103 stores one or more device identifiers.

The client application 118 may present one or more user interfaces, for example, in response to user input or interactions with displayed interactive user interface elements. The user interfaces may include user interfaces that capture user information from one or more sensors 126, as described herein. For example, the user interfaces may include text or other instructions that direct the user of the user device 103 to capture one or more images of the user, place their finger on a fingerprint scanner, or provide other types of biometric input. Additionally, the user interfaces can include interactive elements that enable a user to provide various user data 120, send requests, or to navigate between user interfaces of the client application 118. The client application 118 can be used, for example, to generate one or more data packages 124 using the techniques described herein.

The user data 120 that is obtained by the client application 118 can include any type of information relating to the user, including biometric information such as images of the user's face (or parts thereof), fingerprint scans, one or more voice samples, an iris scan (or an image of the user's eye), palm or finger vein patterns, retinal scans, or the like. Additionally, the user data 120 can include one or more documents that include user information, such as a driver's license of the user, a passport of the user, or any other type of identifying document. Non-identifying information that is associated with the user may also be included, such as records of activities (e.g., interactions, websites visited, applications executed or launched, physical or virtual locations, etc.) performed using the user device, records of offline activities (e.g., transaction records, historic records of user location over periods of time, etc.), or other types of information that may be associated with the user. The user data 120 can be stored in one or more data structures, with each portion of the user data 120 being indexed by a corresponding label or tag value, which can be used to access the respective portion of the user data 120. One or more portions of the user data 120 can be encrypted (or decrypted) using a respective digital key 122.

The client application 118 can generate one or more digital keys 122 using the techniques described herein. The digital keys can be, for example, encryption or decryption keys. Some examples include symmetric encryption/decryption keys or asymmetric encryption/decryption keys (e.g., a private key and a public key). The digital keys 122 can be generated to encrypt information communicated by the user device 103 via the client application 118 to improve the security of the information in transit. The digital keys 122 can be used to protect encrypted information such that the encrypted information cannot be accessed unless using a corresponding decryption key. Key sharing algorithms can be utilized by the user device 103 to share one or more of the digital keys 122 with other computing systems. The key sharing algorithms can include, but are not limited to, the Rivest-Shamir-Adelman (RSA) algorithm, the Diffie-Hellman algorithm, the elliptic-curve Diffie-Hellman (ECDH) algorithm, the ephemeral Diffie-Hellman algorithm, the elliptic-curve ephemeral Diffie-Hellman (ECDHE) algorithm, and the pre-shared key (PSK) algorithm, among others. The digital keys 122 can be generated using any suitable encryption/decryption key generation algorithm.

In an embodiment, respective digital keys 122 can be generated for user-selected portions of the user data 120, or portions of the user data 120 selected by the client application 118. In some implementations, digital keys 122 can be generated for particular portions of the user data 120 and for particular trusted computing systems 102. For example, certain portions of the user data 120 can be encrypted using a first digital key 122 for a first trusted computing system 102, and other portions of the user data 120 may be encrypted using a second digital key 122 for a second trusted computing system 102. This enables the first computing system 102 and the second computing system 102 to access only the respective portions of the user data 120 corresponding to their respective key, while the rest of the user data 120 remains encrypted and inaccessible.

The client application 118 can generate one or more data packages 124 using the techniques described herein. The data packages 124 can include any of the user data 120 that is encrypted using one or more corresponding digital keys 122. Corresponding decryption keys generated as part of the digital keys 122 can be stored for each data package in association with the data package 124, and shared with a corresponding trusted computing system 102 using an appropriate key sharing algorithm, as described herein. The key sharing algorithms can be performed prior to sharing the data package 124 with one or more trusted computing systems 102. The data packages 124 can serve as containers or secure enclaves for information and may be generated by the client application based on a secure token provided by the trusted computing system 102. As described in further detail herein, the trusted computing system 102 can generate a secure token upon verifying that the encrypted user data 120 is authentic. The secure token can be provided to the client application 118, which can then generate a data package that includes the secure token and the encrypted user data 120. In an embodiment, the client application generates the data package by encrypting the user data 120 based on the secure token. The data package can be generated such that that any change to the data package will cause verification of the data package using the security token to fail. Additional digital keys 122 may also be generated to further encrypt the data packages 124, using the techniques described herein.

The user device 103 can include one or more sensors 126. The sensors 126 can include one or more biometric sensors or ambient sensors, or any other type of sensor capable of capturing information about a user or an environment in which the user is present. The sensors 126 can include components that capture ambient sights and sounds (such as cameras and microphones), and that allow the user to provide inputs (e.g., a touchscreen, stylus, force sensor for sensing pressure on a display screen, and biometric components such as a fingerprint reader, a heart monitor that detects cardiovascular signals, an iris scanner, and so forth). The sensors 126 may include one or more location sensors to enable the user device 103 to determine its location relative to, for example, other physical objects or relative to geographic locations. Example location sensors include global positioning system (GPS) devices and other navigation and geolocation devices, digital compasses, gyroscopes and other orientation sensors, as well as proximity sensors or other sensors that allow the user device 103 to detect the presence and relative distance of nearby objects and devices.

The trusted computing system 102 can include a database 106, which may store user profiles 108. The user profiles 108 may each be associated with a corresponding user and may include corresponding trusted user data 110. The trusted user data 110 can be any data that is confirmed to be truthful or correct as relating to the user to which the respective user profile 108 corresponds. The trusted user data 110 can include any information about the user. For example, the trusted user data 110 may include, but is not limited to, personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), biometric information (e.g., images of the user's face, fingerprint scans, one or more voice samples, an iris scan (or an image of the user's eye), palm or finger vein patterns, retinal scans, etc.), or other user or account data that is maintained or otherwise accessible to the trusted computing system 102. The trusted computing system 102 can receive the information for the trusted user data 110 from trusted sources, such as in-person meetings with the user, government agencies, or other sources of truth.

The trusted computing system 102 can utilize the trusted user data 110 in a user profile 108 to verify the authenticity of one or more portions of the encrypted user data 120 received from the user device 103. Verifying the information may include performing a decryption technique using a corresponding digital key 122 shared with the trusted computing system 102 by the user device 103 using an appropriate key sharing algorithm. After decrypting the encrypted user data 120 (or portions of the user data 120 to which the decryption key(s) correspond) the trusted computing system 102 can compare the information in the decrypted data to the trusted user 110. The trusted computing system 102 can identify what portions of the decrypted user data 120 match those (or reasonably correspond to) corresponding portions of the trusted user data 110. These matching portions of the user data 120 can be used to generate a security token. The security token can be any type of value that can be used to verify the integrity of the encrypted user and may be utilized with a generated data package 124 to prevent data tampering. The user devices 103 can communicate with the trusted computing system 102 to carry out the techniques described herein.

In an embodiment, the client application 118 of the user device 103 can communicate with the trusted computing system 102 via the secure API 112. The trusted computing system 102 can maintain and provide access to the secure API 112 to various authorized computing systems, such as the user device 103 via the network 101. The secure API 112 can be an API, such as a web-based API corresponding to a particular network address uniform resource identifier (URI), or uniform resource locator (URL), among others. The secure API 112 can be a client-based API, a server API (SAPI), or an Internet Server API (ISAPI). Various protocols may be utilized to access the secure API 112, including a representational state transfer (REST) API, a simple object access protocol (SOAP) API, a Common Gateway Interface (CGI) API, or extensions thereof. The secure API 112 may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL. The secure API can be secured utilizing one or more encryption techniques, such that the secure API prevents data tampering or data leakage.

The secondary computing system 104 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The secondary computing device 104 can include one or more computing devices or servers that can perform various functions as described herein. The secondary computing device 104 can include any or all of the components and perform any or all of the functions of the computer system 400 described herein in conjunction with FIG. 4.

The secondary computing system 104 can execute one or more secondary applications 116 based on the data packages 124 received from the user device 103. The data packages 124 can include a security token generated by the trusted computing system 102 that is invalidated in the event of any tampering of the data package 124. Therefore, if a verification for the data package 124 performed by the secondary computing system 104 is satisfied, the secondary computing system 104 can rely on the information in the data package 124 being both valid and secure. Therefore, using the valid and secure data in the data package, the secondary computing system 104 can execute one or more secondary applications 116 that correspond to any type of functionality that might utilize the user data 120. For example, the user data 120 in the data package can be used to provide recommendations for retirement products, personal loans, home equity loans, or other financial products. The secondary applications 116 can select loans to recommend to the user that have monthly, semimonthly, or periodic payments that fall within the user's available periodic cash flow.

To verify the data package 124, the secondary computing system 104 can utilize a second digital key 122 generated based on the device identifier and biometric information obtained via the user device 103 to decrypt the data package 124. Prior to decryption, the security token (which may be provided to the secondary computing system 104 with the data package) can be first verified with the trusted computing system 102 as corresponding to the device identifier from which the data package 124 was obtained. Upon verifying the security token, the integrity of the data package 124 can be verified using the security token to confirm that the data package 124 has not been modified. Upon determining that the data package 124 has not been modified, the data package 124 can be decrypted using a digital key 122 obtained from the user device 103 using a suitable key sharing algorithm. The secondary applications can then utilize the data extracted from the decrypted data package 124 to perform further operations, with the assurance that the information extracted from the data package 124 is authentic.

Figure 2:
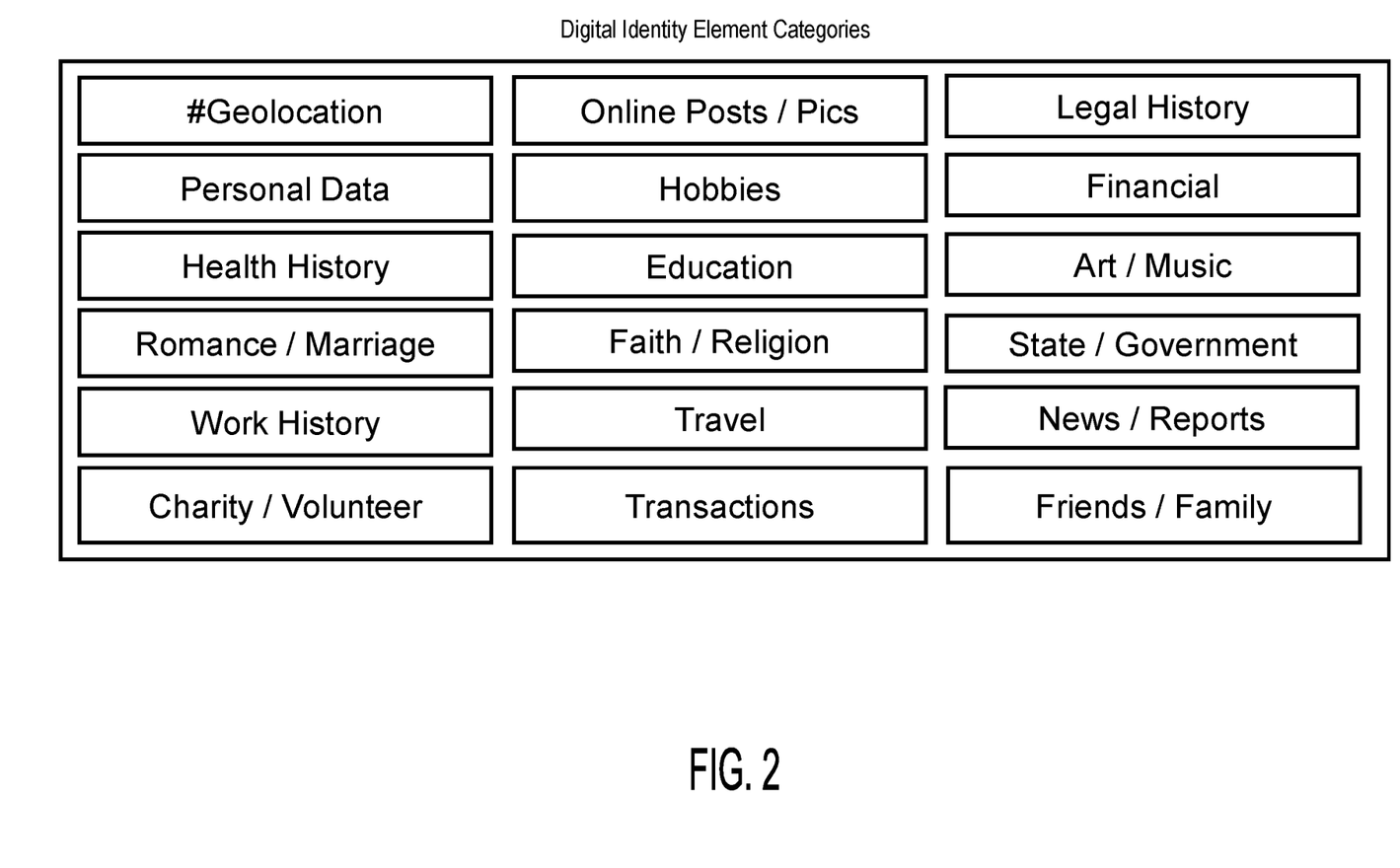
FIG. 2 provides example digital identity element categories that can be maintained in identity databanks and utilized in the techniques described herein, in accordance with one or more example implementations.

The secondary computing system 104 may also maintain an identity construct for the user, and can update the identity construct based on the information extracted from the received data package 124. Referring to FIG. 2 in the context of the components of FIG. 1, illustrated is an example categorization 200 of identity elements that may be present in the identity construct of the user. Information extracted from the data packages 124 received from a user device can be stored in a data structure that may be indexed by or associated with one or more categories. The data points of activities or other user data 120 can be sorted by the secondary computing system 104 into categories, cumulatively constituting the basis for a fundamental digital identity.

As non-exhaustive examples: "geolocation" may include, for example, elements related to where a user has been; "personal data" may include, for example, name and birthdate; "health history" may include, for example, information that might be found in health records; "romance/marriage" may include, for example, information on significant others and spouses; "work history" may include, for example, information on places and dates of employments and titles held; "charity/volunteer" may include information on, for example, charitable contributions or volunteering activities; "online posts/pics" may include, for example, textual posts and pictures/videos/other media submitted to social networking accounts; "hobbies" may include, for example, leisure or other non-employment related activities; "education" may include, for example, information on schools attended and degrees earned; "faith/religion" may include, for example, information on churches attended or religious activities; "travel" may include, for example, information on places visited; "transactions" may include, for example, information on purchases; "legal history" may include, for example, information on legal proceedings; "financial" may include, for example, information on financial accounts; "art/music" may include, for example, information on attendance at concerts and types of art and music purchased or otherwise enjoyed by a user; "state/government" may include, for example, information on licenses; "news/reports" may include, for example, information in broadcasts, publications, or reports that mention a user; and "family/friends" may include, for example, information on children, siblings, and persons with whom the user spends time or otherwise associates.

Figure 3:
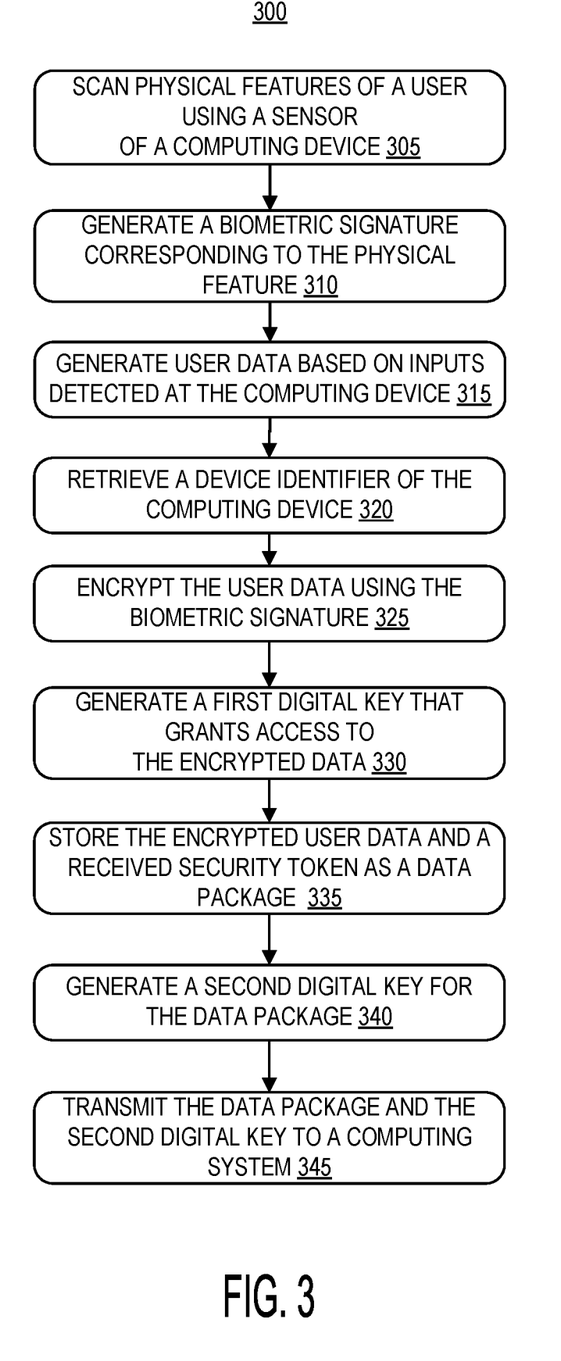
FIG. 3 is a flow diagram of an example method for secure data processing using data packages generated by edge devices, in accordance with one or more example implementations.

Referring to FIG. 3, illustrated is a flow diagram of an example method 300 for secure data processing using data packages (e.g., the data packages 124) generated by edge devices (e.g., the user device 103), in accordance with one or more example implementations. The method 300 can be a computer-implemented method. The method 300 may be implemented, for example, using any of the computing systems described herein, including the user device 103, the secondary computing system 104, the trusted computing system 102, or the computing system 400 described in connection with FIG. 4. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 300 may be performed simultaneously, or one or more operations may be performed as an alternative to another operation.

At step 305, the method 300 can include scanning a physical feature of a user of a computing device (e.g., the user device 103) using a sensor (e.g., a sensor 126) of the computing device. The physical feature can be scanned, for example, using a camera or another type of biometric scanning device of the computing device. For example, the computing device may include components that capture ambient sights and sounds (such as cameras and microphones), and that allow the user to provide inputs (e.g., a touchscreen, stylus, force sensor for sensing pressure on a display screen, biometric components such as a fingerprint reader, a heart monitor that detects cardiovascular signals, an iris scanner, and so forth). In some implementations, the image or video capture devices of the user device 103 that capture video or images can include devices that capture non-visible light, such as infrared (IR) or ultraviolet (UV) light. User interfaces on an application (e.g., the client application 118) executing on the computing device can prompt the user to provide biometric inputs for generating encrypted user data (e.g., the user data 120). The physical feature scanned using the sensor can be, but is not necessarily limited to, a picture of the user's face, a fingerprint of the user, a heart rate or heart rate pattern of the user, an iris scan of the user, a retinal scan of the user, or the like.

In an embodiment, the physical feature is a voice of the user (e.g., a voice print). For example, the computing device can include one or more microphones that can capture a voice of the user. The user interfaces on the computing device can prompt the user to speak predetermined phrases or predetermined or desired portions of the user data (e.g., name, address, date of birth, etc.). The voice of the user can may be applied to a natural language processing (NLP) model (e.g., which may be trained using machine-learning techniques by the secondary computing device 104). The NLP model may be executed by the computing device to extract one or more words or phrases spoken by the user.

Additionally, scanning the physical feature of the user can include applying one or more filters to determine authenticity or validity of the physical feature. The filters may be filters that are applied to determine whether the biometric data is in fact provided by the user, and not "spoofed" by a malicious actor attempting to fraudulently impersonate the user. For example, a malicious actor may spoof the output of a camera to the application to provide a pre-obtained or pre-existing photo of the user that the malicious actor is attempting to impersonate. To circumvent these fraudulent activities, the computing device can gather additional information, such as IR images or UV images from additional sensors on the computing device, and cross-reference the images obtained via the camera (which may be spoofed) with the UV data or IR data captured from additional sensors. Additionally or alternatively, the computing device can execute one or more filters over the captured data to identify one or more anomalies. For example, the computing device can apply one or more IR filters, UV filters, or other non-visible light frequency filters to analyze the integrity of the image of the user's face.

The aforementioned verification techniques can be utilized to determine a score that indicates a likelihood that an appearance of the user is forged. For example, by cross-referencing UV or IR images captured at about the same time that the user's face is captured by a visible-light camera of the computing device, the computing device can detect the presence of one or more anomalies in the visible-light image. The size and number of the detected anomalies can influence the score. For example, larger anomalies or a larger number of anomalies can indicate a larger score (and therefore a higher likelihood that the image is fraudulent). Voice data or other types of biometric data can also be applied to similar filters or anomaly detection models that are trained using machine-learning techniques to detect potentially fraudulent biometric data. The anomaly detection model can be executed using the biometric data as input and can generate a score indicating the likelihood that the biometric data has been forged or is fraudulent. The anomaly detection model can be trained using supervised learning, unsupervised learning, semi-supervised learning, or other machine-learning techniques to calculate the score. Some examples of machine learning models can include neural networks (e.g., a deep neural network (DNN), a convolutional neural network (CNN), a recurrent neural network (RNN) such as a long-short term memory (LSTM) model, combinations thereof, etc.), regression models (e.g., linear regression, sparse vector machine (SVM), logistic regression, polynomial regression, ridge regression, Lasso regression, Bayesian linear regression, etc.), or other types of classifiers (e.g., naïve Bayes, decision trees, k-nearest neighbor (KNN), extreme gradient boosting (XGBoost) models, etc.). The aforementioned machine-learning models may also be utilized for any type of machine-learning or artificial intelligence (AI) performed task described herein. In some implementations, multiple machine-learning models may be executed in a machine-learning pipeline to perform various operations described herein.

At step 310, the method 300 can include generating a biometric signature corresponding to the physical feature. The biometric signature may be a signature, or a reduced version, of the scan performed in step 305. The biometric signature may be generated by performing one or more feature extraction techniques, for example, to reduce the size of the biometric data provided by the user. Reducing the size of the data provided by the user allows for increased efficiency when utilizing the biometric signature to perform further processing steps, such as data encryption. The biometric signature can further be generated to conform to a predetermined data size or format that is compatible with the encryption techniques described herein. For example, the physical feature detected using the biometric techniques described herein can be a facial feature. An example facial feature may relate to aspects (e.g., shape or outline) of a user's eyes, nose, lips, etc. The facial feature may be, or may be based on, a facial image. The biometric signature can be a reduced dataset that preserves the unique or identifying features of the user's face. As such, the biometric signature may be generated using one or more feature extraction techniques, such as edge detection, bounding-box detection, or detection of particular features on the user's face (e.g., position and shape of eyes, nose, mouth, ears, eyebrows, etc.), and their relative positions or distances from one another. This information can be stored as the biometric signature for the user, which may be utilized in subsequent processing steps.

At step 315, the method 300 can include generating user data (e.g., the user data 120) based on inputs detected via one or more input devices of the computing device. The inputs can include information about the user. For example, the application executing on the computing device can prompt the user to provide information relating to the user. In an embodiment, the information may be provided verbally and transcribed by the computing device by executing an NLP model or another type of trained speech-to-text processing model over a voice input recorded using a microphone or another type of audio input.

The user inputs can include an image captured using an image sensor of the computing device. For example, the application may prompt the user to capture one or more images of various documents (e.g., driver's license, medical documents, utility bills, etc.) that include identifying information about the user. The images can be stored in the memory of the computing device and can be utilized in an image processing function or algorithm that can extract pertinent information relating to the user from the image. For example, the computing device can execute a trained artificial intelligence model to identify regions of an image that are likely to correspond to pertinent details (e.g., blocks of text, etc.). Natural language processing operations (e.g., executing additional machine-learning models or other types of image-to-text algorithms like optical character recognition) can be utilized to extract the information about the user. In some implementations, optical character recognition can be used to extract sections of text from the image(s), and then regular expression (regex) rules can be applied to the sections of text to identify and extract the user data. Geolocation data may also be detected using a location sensor of the computing device. The location sensor can generate a geolocation of the computing device corresponding to where the inputs are detected by the computing device. The sensors 126 may include one or more location sensors to enable the user device 103 to determine its location relative to, for example, other physical objects or relative to geographic locations. Example location sensors include global positioning system (GPS) devices and other navigation and geolocation devices, digital compasses, gyroscopes and other orientation sensors, as well as proximity sensors or other sensors that allow the user device 103 to detect the presence and relative distance of nearby objects and devices. In an embodiment, the user data is generated to comprise the geolocation, which may be stored in association with the data provided via user input.

Additionally, the computing device may generate a hash value of a portion of or all of the user data. The hash value may be utilized as a measure to detect whether some or all of the user data has been changed after its original generation. The hash can be a safeguard against potential data tampering and may be utilized as an initial verification process when attempting to process the user data. For example, prior to processing or utilizing the user data in further downstream processing operations, the hash value of the user data can be recalculated and compared with the hash value generated when the user data itself was generated. If there are differences between the hash values, the user data may have been changed by another party (e.g., a hacker or another entity) prior to the attempted utilization of the user data.

At step 320, the method 300 can include retrieving a device identifier corresponding to the computing device. The identifier may be a UUID, a GUID, a MAC address, an IP address, a device serial number, a serial number of a component of the computing device, a predetermined or randomly generated value associated with the computing device, or the like. The computing device can retrieve the one or more device identifiers using an API of an operating system of the computing device. In some implementations, a predetermined region of memory of the computing device that stores one or more device identifiers can be accessed to retrieve the device identifier. The device identifier can then be used in subsequent processing steps to encrypt the user data.

At step 325, the method 300 can include encrypting the user data to generate encrypted user data. The encrypted user data can be generated, for example, by utilizing the biometric signature and the device identifier to generate a private key. The private key may be a hash value of the biometric signature concatenated with the device identifier, or may be individual hash values of the biometric signature and the device identified added together to form a single key value. In addition, salt values or additional data padding may be added to the biometric signature and the device identifiers to generate the private key (e.g., one of the digital keys 122). The private key can then be utilized in a corresponding encryption and key generation algorithm to encrypt the user data. To encrypt the user data, the computing device can execute a suitable encryption algorithm, such as an asymmetric encryption algorithm or a symmetric encryption algorithm to generate the encrypted user data.

At step 330, the method 300 can include generating a first digital key (e.g., a digital key 122) granting access to the encrypted user data and transmitting the digital key to a first computing system. The first digital key can be utilized to decrypt the encrypted user data. For example, the first digital key can be an asymmetric decryption key (e.g., a public key) that is generated as part of the encryption algorithm executed at step 325. Alternatively, the first digital key may be generated as a symmetric decryption key as part of the encryption process executed at step 325. In an embodiment, respective digital keys can be generated for user-selected or predetermined portions of the encrypted user data. In some implementations, digital keys can be generated for particular portions of the user data and for particular trusted computing systems (e.g., particular trusted computing systems 102).

For example, certain portions of the user data can be encrypted using a first set of encryption keys (e.g., each of which may be derived from a combination of the device identifier and the biometric signature) for a first trusted computing system, and other portions of the user data may be encrypted by a second set of encryption keys (e.g., also derived from the device identifier and the biometric signature) that correspond to a second trusted computing system. Corresponding decryption keys can be generated for each encryption key. This enables the first trusted computing system and the second trusted computing system to access only the respective portions of the user data corresponding to their respective decryption key, while the rest of the user data remains encrypted and inaccessible.

The first digital key(s) (e.g., the decryption keys for the encrypted user data) can be stored in association with the encrypted user data, and can be transmitted to the trusted computing system(s) using a suitable key sharing algorithm. Key sharing algorithms can be any algorithm that may be utilized by the computing device to share one or more of the digital keys with other computing systems. The key sharing algorithms can include, but are not limited to, the RSA algorithm, the Diffie-Hellman algorithm, the ECDH algorithm, the ephemeral Diffie-Hellman algorithm, the ECDHE algorithm, and the PSK algorithm, among others.

The computing system can receive the generated security token from a first computing system (e.g., the trusted computing system 102), which can correspond to the user data. The security token can indicate that at least a subset of the user data is valid. As described herein, the trusted computing system can utilize the trusted user data maintained in a database to verify the authenticity of one or more portions of the encrypted user data received from the computing device. Verifying the information may include performing a decryption technique using a corresponding digital key shared using an appropriate key sharing algorithm. After decrypting the encrypted user data (or portions of the user data to which the decryption key(s) correspond), the trusted computing system can compare the information in the decrypted data to the trusted user data corresponding to the requesting user.

The trusted computing system can identify what portions of the decrypted user data match those (or almost match, e.g., match within a tolerance threshold) corresponding portions of the trusted user data. These matching portions of the user data can be used to generate a security token. In an embodiment, the security token may be generated without using the matching portions of the user data. The security token can be any type of value that can be used to verify the integrity of the encrypted user, and may be utilized with the data package 124 to prevent data tampering. To generate the security token, the trusted computing system can generate a hash value, a random value, or another type of token value using a token generation algorithm. A copy of the security token can be stored in association with the one or more portions of the user data to which the security token corresponds (e.g., for further verification purposes in response to a request from a secondary computing device). Upon verifying the encrypted user data, the security token can be transmitted to the computing device. The computing system can then utilize the security token to generate a data package.

At step 335, the method 300 can include storing, at the computing device, the encrypted user data and the security token as part of a data package that is secured and validated in a storage device of the computing device. The data package can be stored or generated such that attempts to alter the data package invalidate the security token. For example, the security token can itself be a hash value of the encrypted user data, which in some implementations may also include a predetermined salt value or other deterministic information. The data package can include the encrypted user data and the security value, such that any tampering of the data package would cause a verification process of the encrypted user data using the security value to fail. For example, the security token may include a hash (or a partial hash) of some or all of the encrypted user data. If the encrypted user data is changed, the hash will be different, and a comparison to the hash included in the security token would not match the hash of the encrypted user data, indicating potential data tampering. The data packages can serve as containers or secure enclaves for information, and may be generated by the client application based on a secure token provided by the trusted computing system. The data package can be generated such that that any change to the data package will cause verification of the data package using the security token to fail.

At step 340, the method 300 can include generating a second digital key corresponding to the data package. The second digital key can be generated when encrypting the data package to transmit the data package to a secondary computing device (e.g., the secondary computing device 104). Encrypting the data package can generate an encrypted data package. The encrypted data package can be generated using similar processes to those used to generate the encrypted user data. For example, the biometric signature and the device identifier can be utilized to generate a private encryption key for the data package. The private key may be a hash value of the biometric signature concatenated with the device identifier, or may be individual hash values of the biometric signature and the device identified added together to form a single key value. In addition, salt values or additional data padding may be added to the biometric signature and the device identifiers to generate the private encryption key. The private encryption key can then be utilized in a corresponding encryption and key generation algorithm, to encrypt the data package.

As part of the encryption process, the computing device can generate a corresponding decryption key (e.g., which may be a public decryption key) that may be used to decrypt the encrypted data package. For example, the second digital key can be an asymmetric decryption key (e.g., a public key) that is generated as part of the encryption algorithm used to encrypt the data package. Alternatively, the second digital key may be generated as a symmetric decryption key as part of the encryption process. The decryption key can be stored in association with the data package at the computing device.

At step 345, the method 300 can include transmitting the data package and the second digital key to a second computing system (e.g., the secondary computing system) for use in executing one or more secondary applications (e.g., the secondary applications 116). The data package can be transmitted, for example, in response to detecting a user input at the application executing at the computing device. The user input can indicate that information relating to the user (e.g., the user data) is to be provided to the second computing system. Alternatively, the data package can be transmitted to the second computing system in response to a request from the second computing system. The data package can be transmitted to the second computing system via a network. The second digital key can be transmitted to the second computing system using a suitable key sharing algorithm. Key sharing algorithms can be any algorithm that may be utilized by the computing device to share one or more of the digital keys with other computing systems. The key sharing algorithms can include, but are not limited to, the RSA algorithm, the Diffie-Hellman algorithm, the ECDH algorithm, the ephemeral Diffie-Hellman algorithm, the ECDHE algorithm, and the PSK algorithm, among others.

Figure 4:
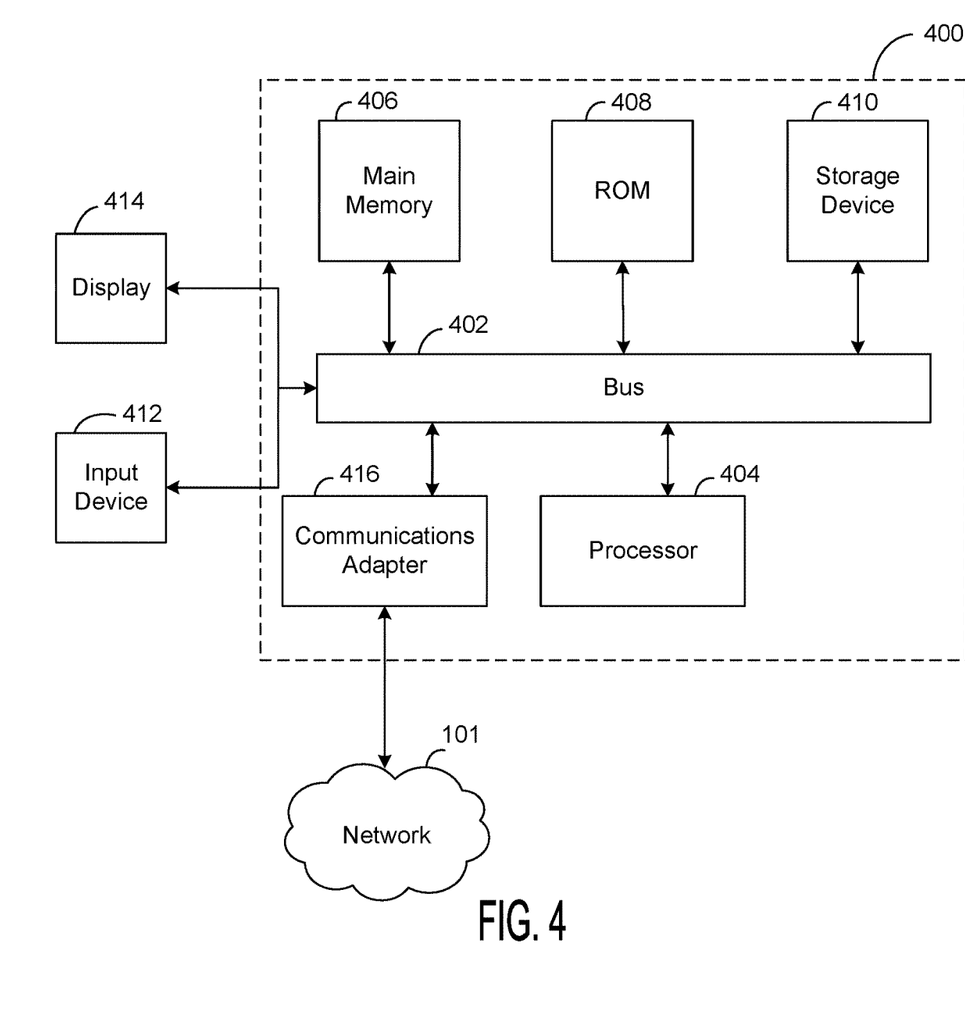
FIG. 4 is a component diagram of an example computing system suitable for use in the various arrangements described herein, in accordance with one or more example implementations.

FIG. 4 is a component diagram of an example computing system suitable for use in the various implementations described herein, according to an example implementation. For example, the computing system 400 may implement an example trusted computing system 102, user device 103, secondary computing system 104, or various other example systems and devices described in the present disclosure.

The computing system 400 includes a bus 402 or other communication component for communicating information and a processor 404 coupled to the bus 402 for processing information. The computing system 400 also includes main memory 406, such as a RAM or other dynamic storage device, coupled to the bus 402 for storing information, and instructions to be executed by the processor 404. Main memory 406 can also be used for storing position information, temporary variables, or other intermediate information during execution of instructions by the processor 404. The computing system 400 may further include a read only memory (ROM) 408 or other static storage device coupled to the bus 402 for storing static information and instructions for the processor 404. A storage device 410, such as a solid-state device, magnetic disk, or optical disk, is coupled to the bus 402 for persistently storing information and instructions.

The computing system 400 may be coupled via the bus 402 to a display 414, such as a liquid crystal display, or active matrix display, for displaying information to a user. An input device 412, such as a keyboard including alphanumeric and other keys, may be coupled to the bus 402 for communicating information, and command selections to the processor 404. In another implementation, the input device 412 has a touch screen display. The input device 412 can include any type of biometric sensor, or a cursor control, such as a mouse, a trackball, or cursor direction keys, for communicating direction information and command selections to the processor 404 and for controlling cursor movement on the display 414.

In some implementations, the computing system 400 may include a communications adapter 416, such as a networking adapter. Communications adapter 416 may be coupled to bus 402 and may be configured to enable communications with a computing or communications network 101 and/or other computing systems. In various illustrative implementations, any type of networking configuration may be achieved using communications adapter 416, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 400 in response to the processor 404 executing an implementation of instructions contained in main memory 406. Such instructions can be read into main memory 406 from another computer-readable medium, such as the storage device 410. Execution of the implementation of instructions contained in main memory 406 causes the computing system 400 to perform the illustrative processes described herein. One or more processors in a multi-processing implementation may also be employed to execute the instructions contained in main memory 406. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. An edge-computing method, comprising:
scanning, using a sensor of a computing device, a physical feature of a user of the computing device;
generating, based on the scan of the physical feature, a biometric signature corresponding to the physical feature;
generating user data based on inputs detected via one or more input devices of the computing device, the inputs comprising information on the user;
retrieving a device identifier corresponding to the computing device;
encrypting, based on the biometric signature and the device identifier, the user data to generate encrypted user data;
generating a first digital key granting access to the encrypted user data and transmitting the first digital key to a first computing system;
receiving, from the first computing system, a security token corresponding to the user data, the security token indicating that at least a subset of the user data is valid;
storing, at the computing device, the encrypted user data and the security token as part of a data package that is secured and validated in a storage device of the computing device, wherein attempts to alter the data package invalidate the security token;
generating a second digital key corresponding to the data package; and transmitting the data package and the second digital key to a second computing system to provide the user a service.

2. The edge-computing method of claim 1, wherein the data package is transmitted in response to detecting a user input indicating that the information on the user is provided to the second computing system.

3. The edge-computing method of claim 1, wherein the data package is transmitted to the second computing system in response to a request from the second computing system.

4. The edge-computing method of claim 1, wherein encrypting the user data based on the biometric signature and the device identifier comprises using data based on both the biometric signature and the device identifier to encrypt the user data.

5. The edge-computing method of claim 1, wherein the physical feature is a facial feature, and wherein the biometric signature is based on facial biometric data detected using the sensor.

6. The edge-computing method of claim 1, wherein the physical feature is a voice of the user, and wherein the sensor is a microphone of the computing device.

7. The edge-computing method of claim 1, wherein the inputs comprise an image captured using an image sensor of the computing device.

8. The edge-computing method of claim 7, further comprising analyzing the image to determine image integrity, wherein analyzing the image comprises at least one of (i) using a non-visible light filter, or (ii) a neural network.

9. The edge-computing method of claim 1, wherein the user data comprises information extracted from an image captured using an image sensor of the computing device.

10. The edge-computing method of claim 1, wherein scanning the physical feature of the user comprises using a plurality of filters to determine authenticity of the physical feature.

11. The edge-computing method of claim 10, wherein the plurality of filters correspond to a plurality of non-visible light frequencies.

12. The edge-computing method of claim 10, wherein determining authenticity of the physical feature comprises determining a likelihood that an appearance of the user is forged.

13. The edge-computing method of claim 1, wherein generating the user data comprises performing a hashing operation on the information of the user.

14. The edge-computing method of claim 1, further comprising detecting, using a location sensor of the computing device, a geolocation of the computing device corresponding to where the inputs are detected by the computing device.

15. The edge-computing method of claim 14, wherein the user data is generated to comprise the geolocation.

16. The edge-computing method of claim 1, wherein retrieving the device identifier comprises requesting the device identifier from an operating system of the computing device.

17. The edge-computing method of claim 1, wherein the first and second digital keys are first and second public keys.

18. A computing device comprising:
a memory storing instructions; and
one or more processors configured to execute the instructions to:
scan, using a sensor of the computing device, a physical feature of a user of the computing device;
generate, based on the scan of the physical feature, a biometric signature corresponding to the physical feature;
generate user data based on inputs detected via one or more input devices of the computing device, the inputs comprising information on the user;
retrieve a device identifier corresponding to the computing device;
encrypt, based on the biometric signature and the device identifier, the user data to generate encrypted user data;
generate a first digital key granting access to the encrypted user data and transmit the first digital key to a first computing system;
receive, from the first computing system, a security token corresponding to the user data, the security token indicating that at least a subset of the user data is valid;
store the encrypted user data and the security token as part of a data package that is secured and validated in a storage device of the computing device, wherein attempts to alter the data package invalidate the security token;
generate a second digital key corresponding to the data package; and
transmit, based on a user input, the data package and the second digital key to a second computing system to provide the user a service.

19. The computing device of claim 18, wherein the computing device is configured to transmit the data package in response to detecting the user input indicating that the information on the user is provided to the second computing system.

20. The computing device of claim 18, wherein encrypting the user data based on the biometric signature and the device identifier comprises using data based on both the biometric signature and the device identifier to encrypt the user data.

* * * * *